US009045142B2

(12) United States Patent
Stanek et al.

(10) Patent No.: US 9,045,142 B2
(45) Date of Patent: Jun. 2, 2015

(54) SENSOR FUSION VEHICLE VELOCITY ESTIMATION SYSTEM AND METHOD

(71) Applicant: Ford Global Technologies, LLC, Dearborn, MI (US)

(72) Inventors: Joe F. Stanek, Northville, MI (US); Mathew Alan Boesch, Plymouth, MI (US); Anthony David Tsakiris, Beverly Hills, MI (US); Tony A. Lockwood, Canton, MI (US); Emrah Adamey, Columbus, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 13/975,547

(22) Filed: Aug. 26, 2013

(65) Prior Publication Data

US 2015/0057832 A1    Feb. 26, 2015

(51) Int. Cl.
*B60W 40/105*    (2012.01)

(52) U.S. Cl.
CPC ................... *B60W 40/105* (2013.01)

(58) Field of Classification Search
CPC ............................. B60Q 1/54; B60W 40/105
USPC ........................ 701/1, 93; 340/441
See application file for complete search history.

(56) References Cited

U.S. PATENT DOCUMENTS

| 5,563,793 | A | 10/1996 | Nakaura |
| 6,426,694 | B1* | 7/2002 | Larson .................... 340/441 |
| 6,816,804 | B1 | 11/2004 | Lee |
| 7,174,241 | B2* | 2/2007 | Tsuruhara et al. ............. 701/1 |
| 7,451,033 | B2 | 11/2008 | Xu et al. |
| 8,275,509 | B2* | 9/2012 | Fritsch et al. ............. 701/30.6 |
| 2008/0306687 | A1 | 12/2008 | Ryu et al. |
| 2011/0098882 | A1 | 4/2011 | Sugisawa et al. |

OTHER PUBLICATIONS

Steinmetz, Erik, et al.: Improved Vehicle Parameter Estimation Using Sensor Fusion by Kalman Filtering, XIX Imeko World Congress, Fundamental and Applied Meterology, Sep. 6-11, 2009, Lisbon, Portugal, pp. 2429-2433.
Zhang, Qi, et al.; Sensor Fusion Based Estimation Technology of Vehicle Velocity in Anti-Lock Braking System; ICIA '-07, International Conference, Jul. 8-11, 2007.
Lee, Hyeongcheol; Reliability Indexed Sesor Fusion for Vehicle Longitudinal and Lateral Velocity Estimation; Jun. 2005.

* cited by examiner

*Primary Examiner* — Mary Cheung
*Assistant Examiner* — Michael Berns
(74) *Attorney, Agent, or Firm* — Carlson, Gaskey & Olds

(57) ABSTRACT

A method according to an exemplary aspect of the present disclosure includes, among other things, arbitrating velocity signals derived from information from a first sensor and a second sensor, estimating a ratio between an actual tire radius and an expected tire radius, and generating a fused velocity estimate based on an arbitrated signal calculated during the arbitrating step and an estimated ratio calculated during the estimating step.

20 Claims, 2 Drawing Sheets

SENSOR FUSION VEHICLE VELOCITY ESTIMATION SYSTEM AND METHOD

TECHNICAL FIELD

This disclosure relates to a vehicle, and more particularly, but not exclusively, to a sensor fusion vehicle velocity estimation system and methodology.

BACKGROUND

Modern vehicles include a number of control systems designed to improve vehicle operation and safety. Accurate information about position, velocity and acceleration of the vehicle may be useful for operating many of such systems. Methods for estimating vehicle velocity are known. However, additional advancements in this field of technology are desirable.

SUMMARY

A method according to an exemplary aspect of the present disclosure includes, among other things, controlling a vehicle using a fused velocity estimate.

In a further non-limiting embodiment of the foregoing method, the method includes arbitrating velocity signals derived from information from a first sensor and a second sensor, estimating a ratio between an actual tire radius and an expected tire radius, and generating the fused velocity estimate based on an arbitrated signal calculated during the arbitrating step and an estimated ratio calculated during the estimating step.

In a further non-limiting embodiment of either of the foregoing methods, the first sensor is a wheel speed sensor associated with an anti-lock braking system and the second sensor is a shaft speed sensor associated with a transmission control module.

In a further non-limiting embodiment of either of the foregoing methods, the step of arbitrating includes comparing a first velocity signal of the first sensor with a second velocity signal of the second sensor and utilizing the first velocity signal as the arbitrated signal where the first velocity signal is consistent with the second velocity signal.

In a further non-limiting embodiment of any of the foregoing methods, the step of arbitrating includes utilizing the velocity signal closest to a third velocity signal of a global positioning system as the arbitrated signal where the first velocity signal is inconsistent with the second velocity signal.

In a further non-limiting embodiment of any of the foregoing methods, the method compares the first velocity signal and the second velocity signal with the third velocity signal of the global positioning system where the difference between the first velocity signal and the second velocity signal exceeds a predefined threshold.

In a further non-limiting embodiment of any of the foregoing methods, the step of estimating includes low pass filtering a ratio between a velocity signal from a global positioning system and the arbitrated signal.

In a further non-limiting embodiment of any of the foregoing methods, the step of generating includes multiplying the arbitrated signal with the estimated ratio to calculate the fused velocity estimate.

In a further non-limiting embodiment of any of the foregoing methods, prior to the step of arbitrating, the method communicates the velocity signals derived from the first sensor and the second sensor and another velocity signal from a global positioning system to a powertrain control module.

In a further non-limiting embodiment of any of the foregoing methods, the method identifies an error in either the first sensor or the second sensor prior to the step of estimating.

In a further non-limiting embodiment of any of the foregoing methods, the method determines whether a constraint exists indicating that the estimating step should not be performed, the constraint including at least one of determining that the arbitrated signal is near zero, determining that vehicle drive wheels are not free rolling and/or determining that vehicle speed is low.

A method according to another exemplary aspect of the present disclosure includes, among other things, calculating an arbitrated velocity signal based on a wheel speed velocity signal, a shaft speed velocity signal, and a global positioning system velocity signal, filtering a ratio between the global positioning system velocity signal and the arbitrated velocity signal and generating a fused velocity estimate of a vehicle based on at least the arbitrated velocity signal and the ratio. A vehicle is controlled using the fused velocity estimate.

In a further non-limiting embodiment of the foregoing method, the wheel speed velocity signal is communicated from an anti-lock braking system and the shaft speed velocity signal is communicated from a transmission control module.

In a further non-limiting embodiment of either of the foregoing methods, the step of calculating includes comparing the wheel speed velocity signal with the shaft speed velocity signal, utilizing the wheel speed velocity signal as the arbitrated velocity signal where the wheel speed velocity signal is consistent with the shaft speed velocity signal and utilizing the velocity signal closest to the global positioning system velocity signal where the wheel speed velocity signal is inconsistent with the shaft speed velocity signal.

In a further non-limiting embodiment of any of the foregoing methods, the ratio is between an actual tire radius and an expected tire radius of at least one vehicle drive wheel.

In a further non-limiting embodiment of any of the foregoing methods, the step of generating includes multiplying the arbitrated velocity signal with the ratio to calculate the fused velocity estimate.

A vehicle velocity estimation system according to an exemplary aspect of the present disclosure includes, among other things, a first system configured to provide a first velocity signal, a second system configured to provide a second velocity signal, a third system configured to provide a third velocity signal and a control unit in communication with the first, second and third systems and configured to calculate a fused velocity estimate based on at least the first, second and third velocity signals.

In a further non-limiting embodiment of the foregoing system, the first system is an anti-lock braking system, the second system is a transmission control module and the third system is a global positioning system.

In a further non-limiting embodiment of either of the foregoing systems, the control unit includes a low pass filter.

In a further non-limiting embodiment of any of the foregoing systems, the control unit is configured to arbitrate the first velocity signal and the second velocity signal.

In a further non-limiting embodiment of any of the foregoing systems, the control unit is part of a powertrain control module.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a sensor fusion vehicle velocity estimation system and method. The vehicle velocity estimation method according to this disclosure relies on internal sensor arbitration, estimation of a ratio between expected and actual tire radius, and an update of arbitrated velocity in order to calculate a fused velocity estimate of the vehicle. Among other features, the proposed system and method provide an accurate and robust approach for estimating vehicle velocity. The fused velocity estimate may be used to control a vehicle.

Figure 1:
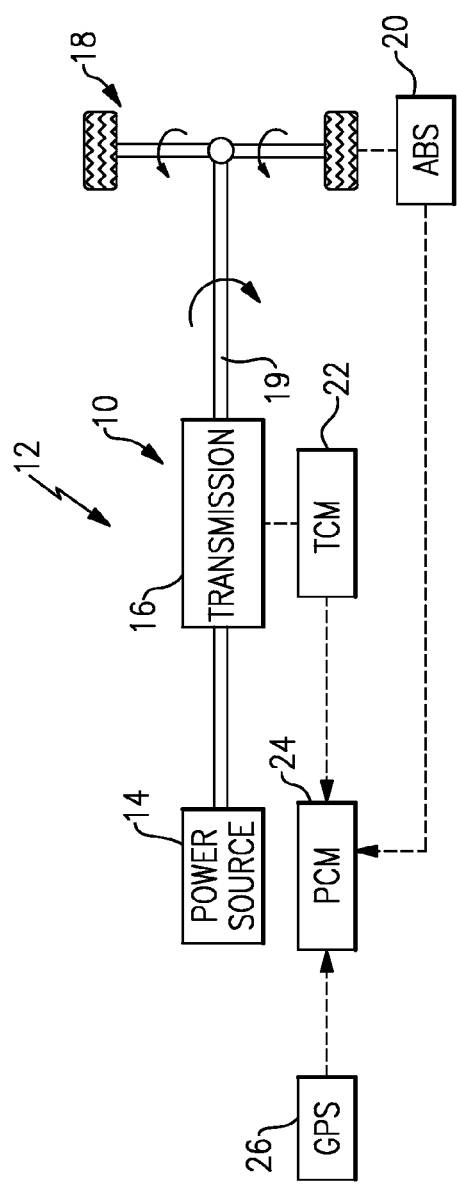
FIG. 1 schematically illustrates a powertrain of a vehicle.

FIG. 1 schematically illustrates a powertrain 10 of a vehicle 12. The vehicle 12 may be either a standard motor vehicle or an electrified vehicle, such as a hybrid electric vehicle (HEV), within the scope of this disclosure. In one embodiment, the powertrain 10 includes a drive system having a power source 14 (i.e., an internal combustion engine for a standard motor vehicle and/or an electric motor for an electrified vehicle) and a transmission 16. The drive system generates torque to drive one or more sets of vehicle drive wheels 18 of the vehicle 12. For example, the power source 14 can be employed to drive the transmission 16, thereby outputting torque to a shaft 19 for driving the vehicle drive wheels 18. Of course, this view is highly schematic and it should be appreciated that the vehicle 12 could incorporate various other components.

The vehicle 12 may additionally include various control systems. For example, the vehicle 12 may be equipped with an anti-lock braking system (ABS) 20 for controlling the vehicle drive wheels 18 during braking events, a transmission control module (TCM) 22 for controlling the transmission 16, a powertrain control module (PCM) 24 that controls the overall operation, management and performance of the powertrain 10, and a global positioning system (GPS) 26 for providing location and time information in real time. Other systems could also be incorporated. In addition, the TCM 22 may be part of or separate from the PCM 24. As discussed in greater detail below, each of the ABS 20, the TCM 22, the PCM 24 and the GPS 26 may be used as part of a system for estimating a velocity of the vehicle 12. Velocity estimation may be necessary for properly operating various control systems of the vehicle 12.

Figure 2:
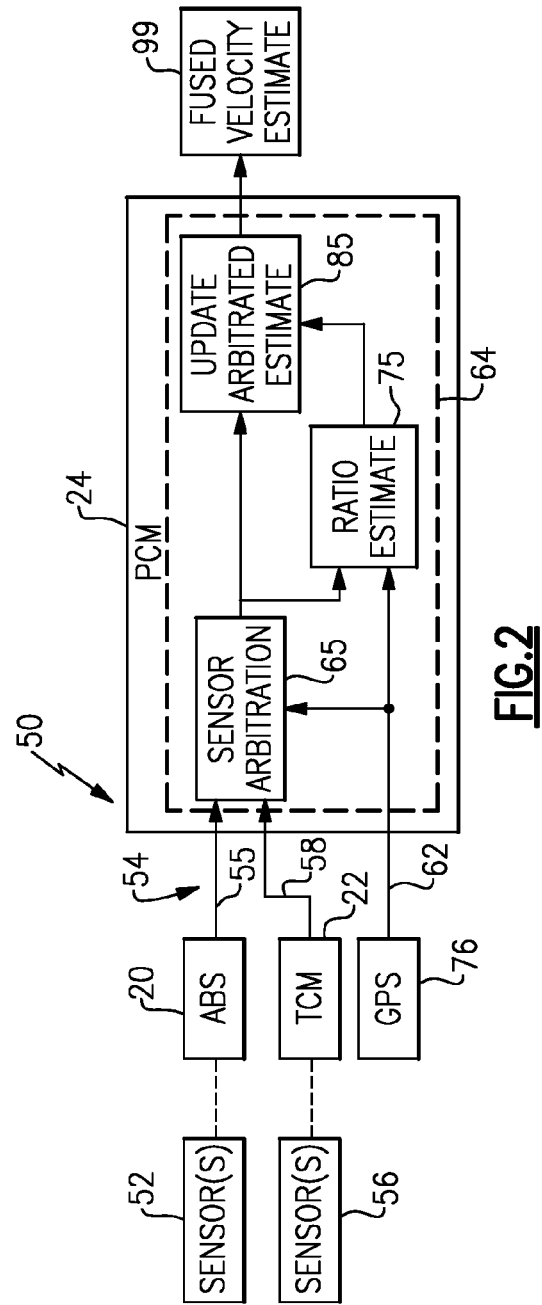
FIG. 2 illustrates an exemplary sensor fusion vehicle velocity estimation system.

FIG. 2 illustrates a sensor fusion vehicle velocity estimation system 50 that can be incorporated into a vehicle, such as the vehicle 12 of FIG. 1. The sensor fusion vehicle velocity estimation system 50 is configured to generate a fused velocity estimate 99 that is more accurate and reliable compared to prior art vehicle velocity estimation systems. The fused velocity estimate 99 can be used to control a vehicle, such as to enhance the control and safety of the vehicle 12. For example, as non-limiting examples, the fused velocity estimate 99 may be used for stability and chassis control functions of the vehicle 12.

In one non-limiting embodiment, the sensor fusion vehicle velocity estimation system 50 uses the ABS 20, the TCM 22, the PCM 24 and the GPS 26 to calculate the fused velocity estimate 99. One or more sensors 52, such as wheel speed sensors, are associated with the ABS 20 and are configured to monitor wheel speed velocities of the vehicle drive wheels 18 (see FIG. 1). In one embodiment, at least one sensor 52 is positioned in a hub of each wheel of the vehicle drive wheels 18 to monitor the wheel speed velocities. A first velocity signal of the vehicle 12 can be calculated by the ABS 20 by multiplying the wheel speed velocities sensed by the sensor 52 by an expected tire radius of the wheel. The first velocity signal(s) can be communicated to the PCM 24 over a first path 55 of a controlled area network (CAN) 54 for use in calculating the fused velocity estimate 99.

One or more sensors 56 may also be associated with the TCM 22. In one non-limiting embodiment, the sensor 56 is a shaft speed sensor that monitors a shaft speed velocity of the shaft 19 of the transmission 16. The sensor 56 may be embedded anywhere within the transmission 16. The TCM 22 receives the shaft speed velocity signals from the sensor 56 and uses them to calculate a second velocity signal of the vehicle 12. For example, the second velocity signal can be derived from the shaft speed velocities by projecting the shaft speed velocity signals to wheel speed, which can then be projected to vehicle velocity. The second velocity signal is communicated to the PCM 24 over a second path 58 of the CAN 54.

In another embodiment, the TCM 22 is part of the PCM 24. In such an embodiment, the shaft speed velocity signals are not necessarily communicated over the CAN 54. For example, the shaft speed velocity signals could be provided via internal software variables.

The GPS 26 may be mounted at any location of the vehicle 12. As is known, the GPS 26 utilizes satellite information to track, in real time, a location of the vehicle 12. The GPS 26 can derive vehicle speed based on position changes of the vehicle 12 over an amount of time. This vehicle speed may be represented as a third velocity signal that is communicated to the PCM 24 over a third path 62 of the CAN 54.

The PCM 24 communicates with each of the ABS 20, the TCM 22 and the GPS 26 and is configured to control the various operations of the powertrain 10 of the vehicle 12. In one embodiment, the PCM 24 receives each of the first, second and third velocity signals from the ABS 20, the TCM 22 and the GPS 26, respectively. A control unit 64 located inside of the PCM 24 can calculate the fused velocity estimate 99 based on at least these separate signals.

In one embodiment, the control unit 64 of the PCM 24 may be programmed with one or more algorithms designed to calculate the fused velocity estimate 99 of the vehicle 12. As discussed in greater detail below, in one non-limiting embodiment, the fused velocity estimate 99 calculated by the control unit 64 may be based on internal sensor arbitration between the sensor 52 and the sensor 56 (shown schematically at 65), an estimation of a ratio between expected and actual tire radius of the tires of the vehicle drive wheels 18 (shown schematically at 75), and an update of arbitrated velocity (shown schematically at 85).

Figure 3:
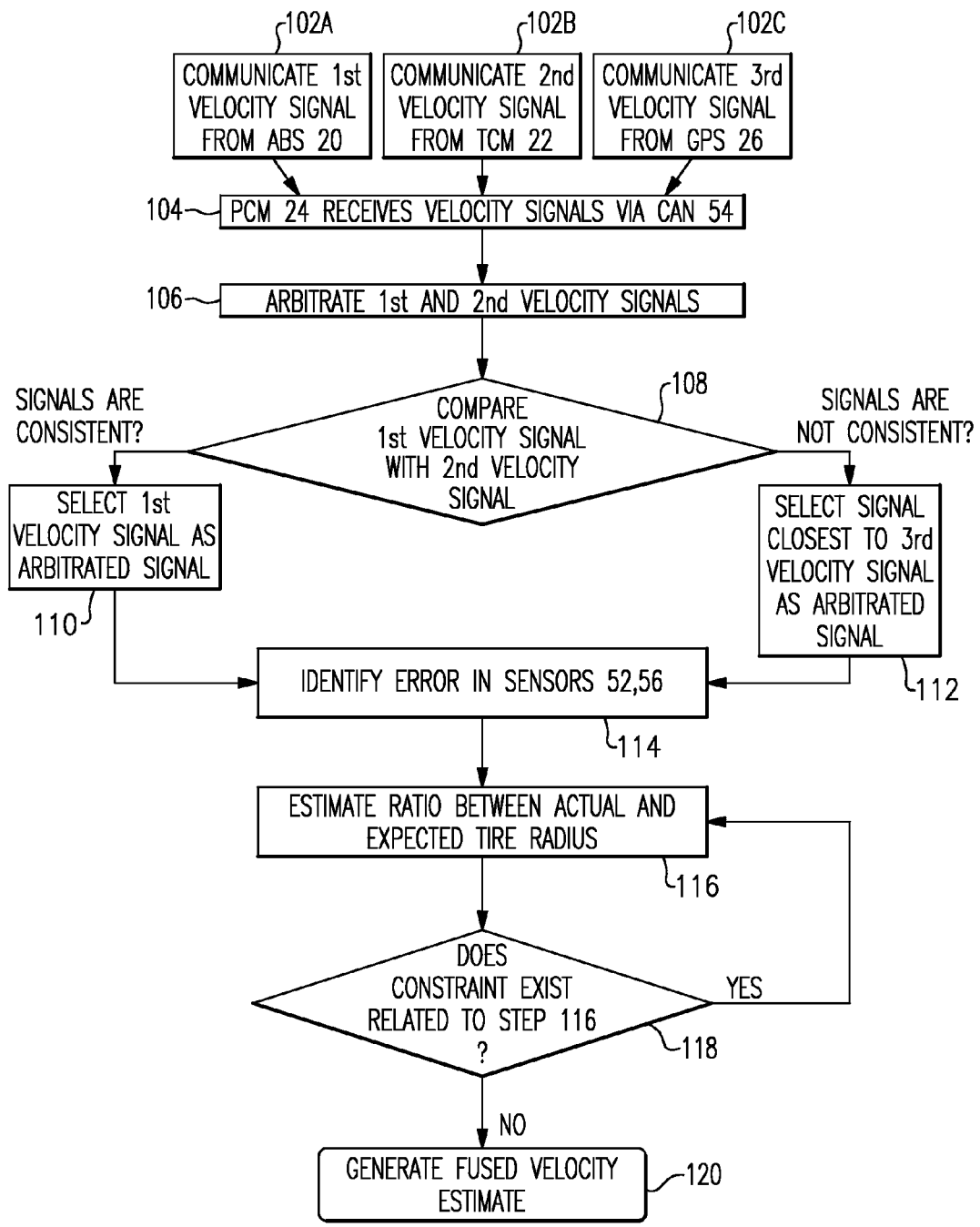
FIG. 3 illustrates an exemplary sensor fusion vehicle velocity estimation method.

FIG. 3, with continued reference to FIGS. 1 and 2, schematically illustrates an exemplary sensor fusion vehicle velocity estimation method 100. The method 100 may be performed to calculate the fused velocity estimate 99 of the vehicle 12. The fused velocity estimate 99 may include information necessary for operating various control systems of the vehicle 12.

The method 100 begins at steps 102A, 102B and 102C by communicating the first velocity signal from the ABS 20, the second velocity signal from the TCM 22, and the third velocity signal from the GPS 26 to the PCM 24. As stated above, the first velocity signal is calculated by the ABS 20 based on wheel speed information collected by the sensor(s) 52, the second velocity signal is calculated by the TCM 22 based on shaft speed information collected by the sensor 56, and the third velocity signal is calculated by the GPS 26 based on position changes of the vehicle 12 over an amount of time. The PCM 24 receives at least the three separate velocity signals over the CAN 54 ate step 104.

Next, at step 106, the first velocity signal derived from the information form the sensor 52 and the second velocity signal derived from information from the sensor 56 are arbitrated. In one embodiment, the arbitration process performed at step 106 is a prioritization technique in which preference is given to one velocity signal over the other velocity signal based on which value is considered to be the best value between the two. One example arbitration process is represented in Table 1, shown below:

TABLE 1

| CONDITION | ARBITRATION RESULT | RATIONALE |
| --- | --- | --- |
| First velocity signal and second velocity signal agree. | Select first velocity signal as the arbitrated signal. | First velocity signal from ABS 20 is expected to be more accurate. |
| First velocity signal and second velocity signal disagree. | Select the velocity signal that is closest to the velocity signal of the GPS 26 as the arbitrated signal. | First and second velocity signals should agree unless there is a sensor failure. Velocity signal from GPS 26 should be reasonably close to non-failed sensor velocity calculation. |

In one embodiment, the arbitration process includes comparing the first velocity signal from the ABS 20 with the second velocity signal from the TCM 22 at step 108. The first velocity signal from the ABS 20 is selected as the arbitrated signal at step 110 where the first velocity signal is consistent (within a reasonable mathematical degree) with the second velocity signal from the TCM 22. Alternatively, as shown by step 112, the velocity signal (between the first and second velocity signals) that is closest to the third velocity signal from the GPS 26 is chosen as the arbitrated signal where the first velocity signal and the second velocity signal are inconsistent (i.e., the difference between the two values exceeds a predefined threshold). In this way, the velocity signal from the GPS 26 is used in the arbitration process.

At step 114, the consistency of the velocity signals received by the PCM 24 from each of the ABS 20, the TCM 22 and the GPS 26 can be evaluated. In other words, step 114 may include a consistency based failure detection analysis that can be performed as part of the arbitration process to identify a failure in the sensor(s) 52 or the sensor 56. A failure may cause temporary signal loss between the ABS 20 or the TCM 22 and the PCM 24 over the CAN 54.

In one embodiment, a Bayesian failure detection analysis is used in which sensor failures are inferred in an iterative fashion by integrating evaluations at each step through time into a probability assessment of the velocity signals. In another embodiment, a static failure detection analysis is used in which sensor failures are evaluated for each time step independently.

Velocity signals that are derived from wheel speeds are calculated based on an expected tire radius and therefore may become inaccurate over time due to changes in the actual tire radius. Accordingly, at step 116, an estimated ratio between an actual tire radius and an expected tire radius is calculated. The estimated ratio may be used to generate the fused velocity estimate 99. In one non-limiting embodiment, the estimated ratio is calculated by low pass filtering a ratio between the third velocity signal from the GPS 26 and the arbitrated signal selected during steps 108, 110 and/or 112. For example, the filter's frequency characteristics can be selected so that it filters out measurement errors in the third velocity signal from the GPS 26 and the arbitrated signal but tracks the changes on actual tire radius.

Next, at step 118, the method 100 determines whether a constraint exists for not performing step 116. In one embodiment, step 116 is not performed (or is repeated to supply a new ratio) where the arbitrated signal is close to zero. In another embodiment, step 116 is not performed where the vehicle drive wheels 18 are not in a free rolling condition. In yet another embodiment, step 116 is not performed where the vehicle 12 is traveling at a relatively low speed (e.g., below 15 m.p.h.).

Finally, where a constraint is not identified at step 118, the fused velocity estimate 99 is generated at step 120. The fused velocity estimate 99 may be calculated by the control unit 64 of the PCM 24 by multiplying the arbitrated signal by the estimated ratio calculated at step 116. The fused velocity estimate 99 provides an accurate and robust estimate of the velocity of the vehicle 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should additionally be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
receiving velocity signals from at least a first sensor and a second sensor;
arbitrating the velocity signals;
estimating a ratio between an actual tire radius and an expected tire radius;
generating a fused velocity estimate based on an arbitrated signal calculated during the arbitrating step and an estimated ratio calculated during the estimating step; and
controlling a vehicle using the fused velocity estimate.

2. The method as recited in claim 1, wherein the step of arbitrating includes:
comparing a first velocity signal of the first sensor with a second velocity signal of the second sensor;
utilizing the first velocity signal as the arbitrated signal where the first velocity signal is consistent with the second velocity signal.

3. The method as recited in claim 2, wherein the step of arbitrating includes:

utilizing the velocity signal closest to a third velocity signal of a global positioning system as the arbitrated signal where the first velocity signal is inconsistent with the second velocity signal.

4. The method as recited in claim 3, comprising:
comparing the first velocity signal and the second velocity signal with the third velocity signal of the global positioning system where the difference between the first velocity signal and the second velocity signal exceeds a predefined threshold.

5. The method as recited in claim 1, wherein the step of estimating includes:
low pass filtering a ratio between a velocity signal from a global positioning system and the arbitrated signal.

6. The method as recited in claim 1, wherein the step of generating includes:
multiplying the arbitrated signal with the estimated ratio to calculate the fused velocity estimate.

7. The method as recited in claim 1, comprising the step of:
prior to the step of arbitrating, communicating the velocity signals derived from the first sensor and the second sensor and another velocity signal from a global positioning system to a powertrain control module.

8. The method as recited claim 1, comprising identifying an error in either the first sensor or the second sensor prior to the step of estimating.

9. The method as recited in claim 1, comprising determining whether a constraint exists indicating that the estimating step should not be performed, the constraint including at least one of:
the arbitrated signal is near zero;
vehicle drive wheels are not free rolling; and/or
a vehicle speed is low.

10. The method as recited in claim 1, wherein the step of controlling the vehicle includes using the fused velocity estimate to perform real-time stability and chassis control functions of the vehicle.

11. The method as recited in claim 1, wherein the first sensor is a wheel speed sensor and the second sensor is a shaft speed sensor, and the step of arbitrating includes:
determining a ratio between a first velocity signal of the wheel speed sensor and a second velocity signal of the shaft speed sensor; and
selecting the first velocity signal as the arbitrated signal where the ratio indicates consistency between the first velocity signal and the second velocity signal.

12. A method, comprising:
calculating an arbitrated velocity signal based on a wheel speed velocity signal received from a first sensor, a shaft speed velocity signal received from a second sensor, and a global positioning system velocity signal received from a third sensor;
filtering a ratio between the global positioning system velocity signal and the arbitrated velocity signal;
generating a fused velocity estimate of a vehicle based on at least the arbitrated velocity signal and the ratio; and
controlling the vehicle using the fused velocity estimate.

13. The method as recited in claim 12, wherein the wheel speed velocity signal is communicated from an anti-lock braking system and the shaft speed velocity signal is communicated from a transmission control module.

14. The method as recited in claim 12, wherein the step of calculating includes:
comparing the wheel speed velocity signal with the shaft speed velocity signal;
utilizing the wheel speed velocity signal as the arbitrated velocity signal where the wheel speed velocity signal is consistent with the shaft speed velocity signal; and
utilizing the velocity signal closest to the global positioning system velocity signal where the wheel speed velocity signal is inconsistent with the shaft speed velocity signal.

15. The method as recited in claim 12, wherein the step of generating includes:
multiplying the arbitrated velocity signal with the ratio to calculate the fused velocity estimate.

16. The method as recited in claim 12, wherein the step of filtering includes using a low pass filter to filter the ratio between the global positioning velocity signal and the arbitrated velocity signal.

17. A vehicle velocity estimation system, comprising:
an anti-lock braking system configured to provide a first velocity signal;
a transmission control module or a powertrain control module configured to provide a second velocity signal;
a global positioning system configured to provide a third velocity signal; and
a control unit in communication with said anti-lock braking system, said transmission control module or said powertrain control module, and said global positioning system and configured to calculate a fused velocity estimate based on at least said first, second and third velocity signals.

18. The system as recited in claim 17, wherein said control unit includes a low pass filter.

19. The system as recited in claim 17, wherein said control unit is configured to arbitrate said first velocity signal and said second velocity signal.

20. The system as recited in claim 17, wherein said control unit is part of said powertrain control module.

* * * * *